US007242904B2

(12) United States Patent
Rao et al.

(10) Patent No.: US 7,242,904 B2
(45) Date of Patent: Jul. 10, 2007

(54) DUAL-BAND MULTIPLE BEAM ANTENNA SYSTEM FOR COMMUNICATION SATELLITES

(75) Inventors: Sudhakar K. Rao, Torrance, CA (US); David Bressler, Los Angeles, CA (US); Arun Bhattacharyya, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/259,913

(22) Filed: Oct. 27, 2005

(65) Prior Publication Data

US 2006/0063528 A1 Mar. 23, 2006

Related U.S. Application Data

(63) Continuation of application No. 10/060,822, filed on Jan. 30, 2002, now Pat. No. 7,110,716.

(51) Int. Cl.
*H04B 7/185* (2006.01)

(52) U.S. Cl. .................... 455/13.3; 455/428; 455/429; 342/354

(58) Field of Classification Search ............... 455/13.3, 455/428, 422.9; 342/354
See application file for complete search history.

(56) References Cited

U.S. PATENT DOCUMENTS 6,504,514 B1 * 1/2003 Toland et al. ............ 343/781 P

FOREIGN PATENT DOCUMENTS

EP 1087463 A2 * 3/2001

* cited by examiner

*Primary Examiner*—Lana N. Le
*Assistant Examiner*—Angelica M. Perez
(74) *Attorney, Agent, or Firm*—Ostrager Chong Flaherty & Broitman P.C.

(57) ABSTRACT

A dual-band multiple beam antenna system for a communications satellite sharing a set of reflector antennas for the transmit and receive frequencies. One set of reflectors is common to both the downlink and uplink frequencies. The feed horns are diplexed and exhibit frequency-dependent radiation patterns that separate the phase centers over the downlink and uplink frequency bands to obtain dual-band performance. The focal point of the reflector is in close proximity to the phase center corresponding to the downlink frequency band. The phase center for the uplink frequency band is spaced a predetermined distance from the phase center of the downlink frequency band. According to the present invention, the uplink frequencies are defocused and the downlink frequencies are focused thereby creating identical radiation patterns at both frequency bands and over the coverage region of the communications satellite.

2 Claims, 6 Drawing Sheets

DUAL-BAND MULTIPLE BEAM ANTENNA SYSTEM FOR COMMUNICATION SATELLITES

This application is a continuation of U.S. application Ser. No. 10/060,822, filed Jan. 30, 2002, now U.S. Pat. No. 7,110,716.

TECHNICAL FIELD

The present invention relates generally to a system and method for communication satellites having multiple spot beams and more particularly to a system and method for combining transmit and receive functions in one set of reflectors on a communication satellite.

BACKGROUND OF THE INVENTION

A typical communications satellite employing multiple spot beams requires a finite number of reflectors for the downlink, or transmit, frequencies and another set of reflectors for the uplink, or receive, frequencies. The two sets of reflectors usually contain about three or four reflectors and the reflectors are sized according to the frequencies. On board the satellite, the antenna farm typically consists of four offset reflector antennas for the downlink being located on one side of the spacecraft. The uplink reflectors, usually about two-thirds the size of the downlink reflectors, are located on the opposite side of the spacecraft.

Each set of reflectors employs dedicated feeds optimized over a narrow band. Each of the beams is produced by a dedicated feed horn. These payloads require a significant amount of real estate on the satellite. The east and west sides of the spacecraft are dedicated to the uplink and downlink spot beam payloads. This leaves only the nadir face of the spacecraft for other payloads. In addition to the number of feeds necessary for each set of reflectors, the large number of reflectors requires associated deployment mechanisms and support structures.

Attempts have been made to mitigate these problems. One approach is to use a single reflector for each frequency band and employ a large number of feed horns with a low-level beamforming network dedicated to each reflector. Each beam is generated by an overlapping cluster of horns (typically seven). This requires an element sharing network and a beamforming network to form multiple overlapping beams. However, any advantage gained by having fewer reflectors is overridden by the need for more feeds. This approach requires approximately thirty percent more feeds than the number of feed required for the conventional approach described above. Further, a large number of amplifiers and complex and heavy beamforming networks introduce additional cost and increased complexity to the system.

Another approach uses a solid reflector with a frequency selective surface (FSS) subreflector with separate feed arrays. The FSS subreflector transmits the downlink frequencies and reflects the uplink frequencies. In this approach, the number of main reflectors is reduced by a factor of two, but there is a need for complex FSS subreflectors, which require more volume to package on the spacecraft. In addition there is an increased loss with the FSS subreflector, which negatively impacts the overall electrical performance.

Yet another approach uses a FSS main reflector and dual-band feed horns. This approach employs one set of reflectors, where each reflector has a central solid region that is reflective to both frequency bands and an outer ring FSS region that is reflective at downlink frequencies and non-reflective at uplink frequencies. The electrical sizes of the reflector are different at the two bands and can be adjusted to achieve some beam coverage on the ground. This design approach is complex and very expensive. In addition there is still the disadvantage of losses associated with the FSS reflector.

There is a need for a reflector system that does not take up valuable real estate on board the spacecraft and at the same time is less complex and expensive than known methods.

SUMMARY OF THE INVENTION

The present invention is a dual-band multiple beam antenna system for a communication satellite that has only one set of reflectors common to both the downlink and the uplink frequencies. The reflectors are fed with dual-band frequency-dependent horns that illuminate the corresponding reflectors optimally at transmit frequencies while under illuminating the reflector at the receive frequencies. The frequency-dependent design of the feed horns physically separates the transmit and receive phase centers. The feeds of the reflector system are defocused at the receive frequencies while they are focused at the transmit frequencies.

According to the present invention, identical beams can be generated from the same reflector over two frequency bands that are separated, either widely or closely. The surface of the reflector can be a simple paraboloid or it can be shaped slightly to optimize the coverage gain and co-polar isolation of the multi-beam antenna system.

It is an object of the present invention to provide identical beams over the uplink and downlink frequency bands. It is another object of the present invention to use only one set of reflectors being fed by dual-band frequency-dependent feed horns.

A further object of the present invention is to reduce the number of horns by a factor of two. Still a further object of the present invention is to reduce the amount of space required by the antenna system on board a satellite while reducing complexity and cost of the satellite.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference is now made to the embodiments illustrated in greater detail in the accompanying drawings and described below by way of examples of the invention. In the drawings.

DETAILED DESCRIPTION OF PREFERRED EMBODIMENTS

Figure 1:
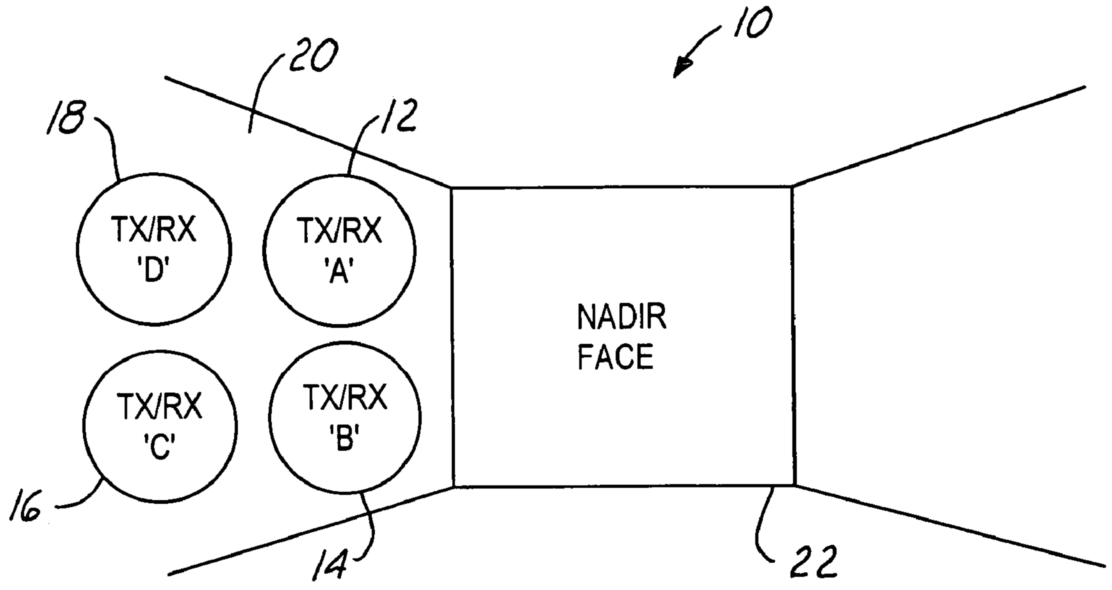
FIG. 1 is a diagram of a multiple beam antenna having four dual-band reflectors on a satellite.
Figure 2:
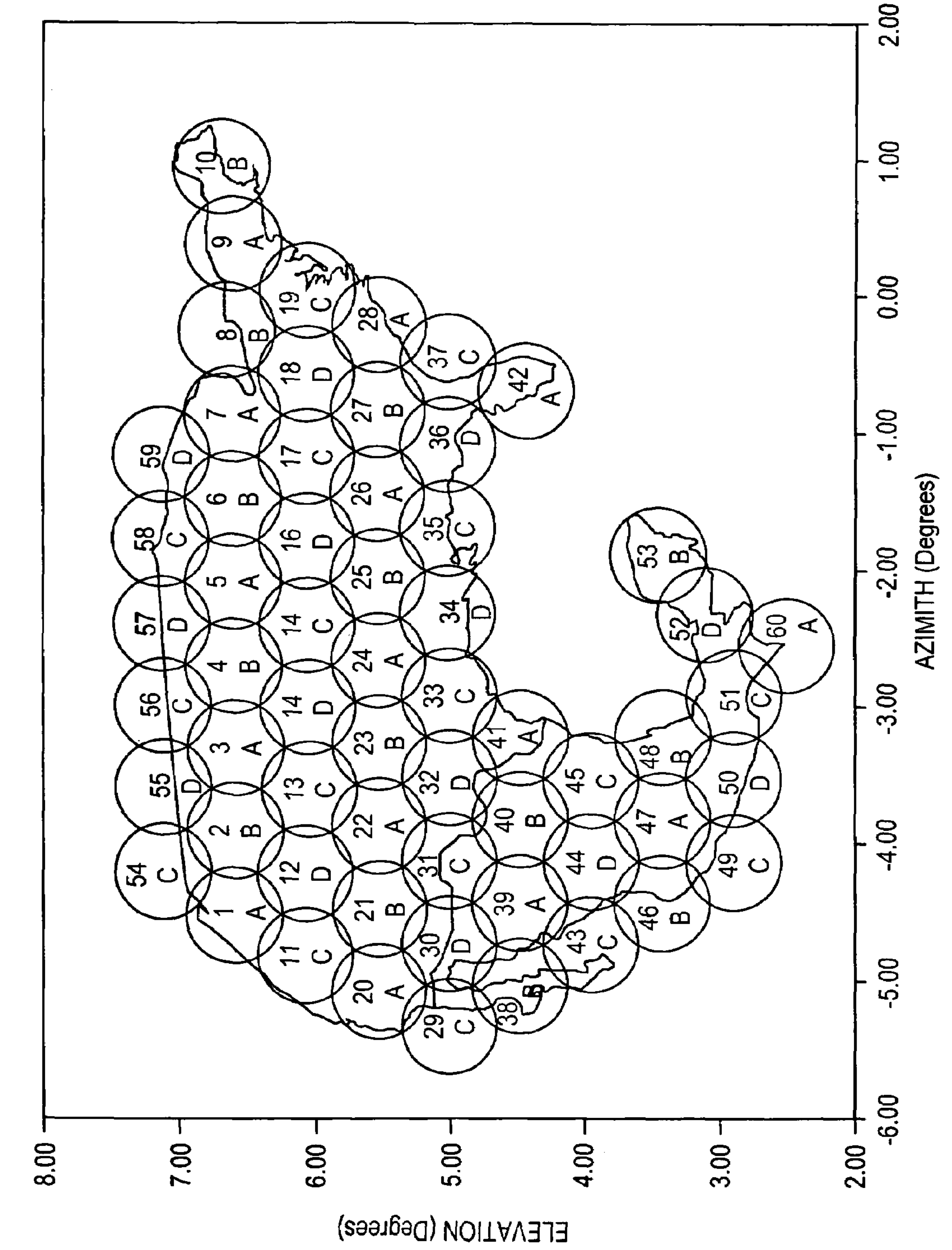
FIG. 2 is a typical beam layout with a four cell frequency reuse pattern.

FIG. 1 shows the dual-band multiple beam antenna system 10 of the present invention. In the embodiment shown in FIG. 1, there are four offset reflector antennas 12, 14, 16 and 18 on the west face 20 of a satellite 22. Each reflector 12, 14, 16 and 18 is being fed by a horn array in order to generate a composite, four cell, reuse pattern on the ground. FIG. 2 shows the cell reuse pattern generated by the antenna system in FIG. 1. There are four cell frequencies shown as "A", "B", "C", and "D". All beams having the same frequency designation, for example "A", reuse the same frequency and may be generated from the same aperture. These beams need to maintain a predetermined co-polar isolation (C/I) value in order to minimize the interference among beams. The C/I is typically greater than 15 dB.

Referring again to FIG. 1, the reflectors 12, 14, 16 and 18 are simple paraboloids and are fed with dual-band horns that operate in a frequency dependent mode. In an alternate embodiment, the surface of the reflector is used to shape the beams for a particular application.

In the frequency dependent mode, the dual-band horns (not shown in FIG. 1) exhibit frequency dependent radiation patterns with phase centers that are widely separated over the downlink and uplink frequencies. The downlink phase center of the horn is close to the reflector focal point while the uplink phase center is away from the focal point or defocused. This allows the horn to create a non-uniform or quadratic phase front across the reflector in order to broaden the antenna patterns at the uplink frequencies. Also, the amplitude patterns of the horns are designed such that they illuminate the reflector optimally at downlink frequencies and under-illuminate the reflector, using a large amplitude taper, at the uplink frequencies in order to broaden the antenna secondary patterns at the receive band.

Figure 3:
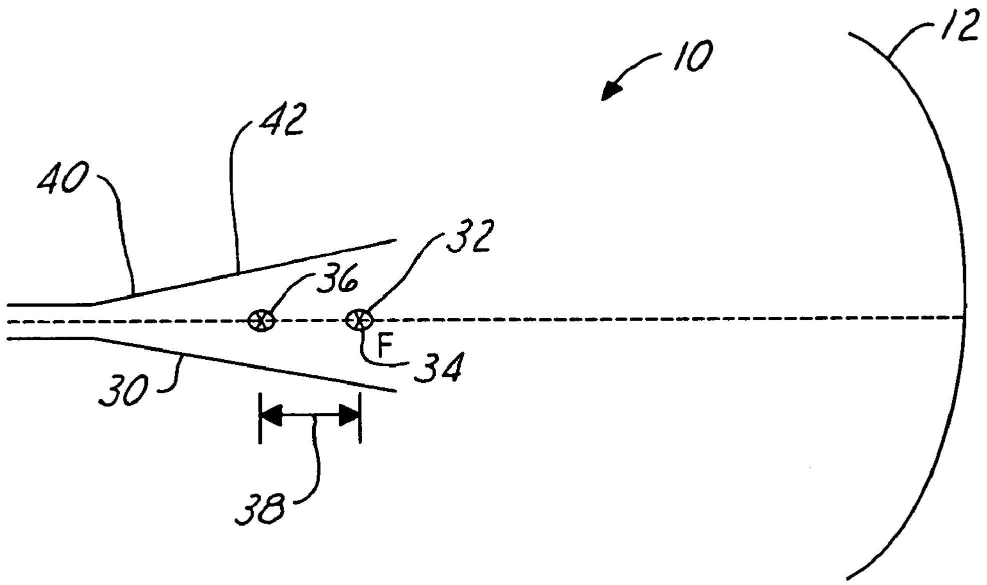
FIG. 3 is a diagram of one embodiment of the multiple beam reflector antenna of the present invention using a dual-band, frequency-dependent horn.

FIG. 3 shows a single reflector 12 and a single dual-band horn 30 used in the system 10 of the present invention. The focal point 32 of the reflector 12 coincides with the phase center 34 of the transmit frequency band. The phase center 36 of the receive band is spaced a predetermined distance 38 from the phase center of the transmit band. The phase variation from the spherical wavefront from the planar wavefront at the aperture of the horn, normalized to wavelength, is preferably less than 0.3 in order to achieve the desired physical separation of the horn phase centers.

The aperture size of the horn 30 is selected based on the beam deviation factor and the center-to-center spacing among beams reusing the same frequency. The design of the horn 30 involves the design of the throat section 40 and the design of the flared section 42 of the horn. The throat section 40 provides a smooth transition from dominant circular waveguide mode, also called TE11, to corrugated waveguide mode, also called HE11 balanced hybrid mode.

Figure 4:
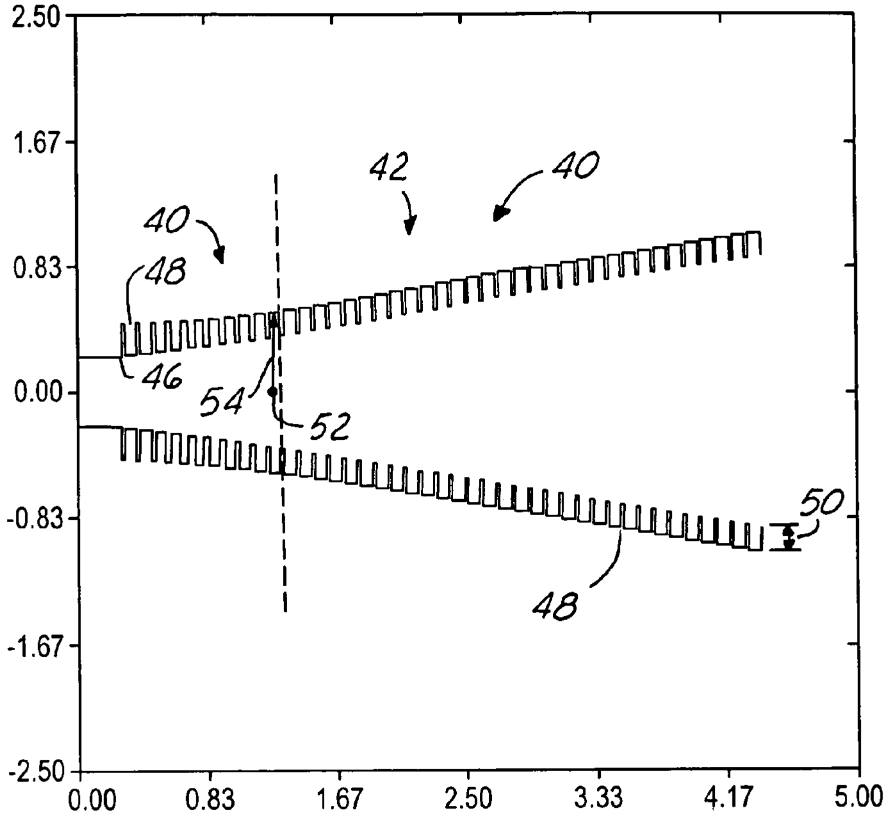
FIG. 4 is a diagram of a synthesized geometry for one embodiment of the dual-band corrugated horn according to the present invention.

The geometry of the horn is best described in conjunction with the corrugated horn 40 shown in FIG. 4. It should be noted that while a corrugated horn is described herein, one skilled in the art is capable of substituting other horn designs, such as a high efficiency horn with smooth walls, without departing from the scope of the present invention. The corrugated horn 40 has slots 46, teeth 48 and corrugation depths 50. In order to minimize the reflection loss, the slot-widths 46 of the throat section are exponentially increased from a minimum percentage to a maximum percentage of the wavelength at the center frequency of the two bands. The thickness of the teeth 48 is tapered down exponentially from a maximum percentage to a minimum percentage of the center frequency wavelength. This gradual variation of the width of the slots 46 and the thickness of the teeth 48 makes a smooth transition from the TE11 mode to the HE11 mode, thereby minimizing the reflection loss due to modal transformation.

The depth of the corrugations 50 is varied from half wavelengths to about a quarter wavelength in order to achieve best match and low cross-polar levels at both frequency bands. The throat section 40 ends in a circular waveguide 52 having a predetermined radius 54 in order to support propagation of the balanced hybrid mode.

The flared section 42 is designed such that the desired variation in phase centers is achieved over the uplink and downlink frequency bands. The flared section 42 is linearly tapered and the depth of the corrugations 50 and the thickness of the teeth 48 are kept uniform in this section 42.

Figure 5:
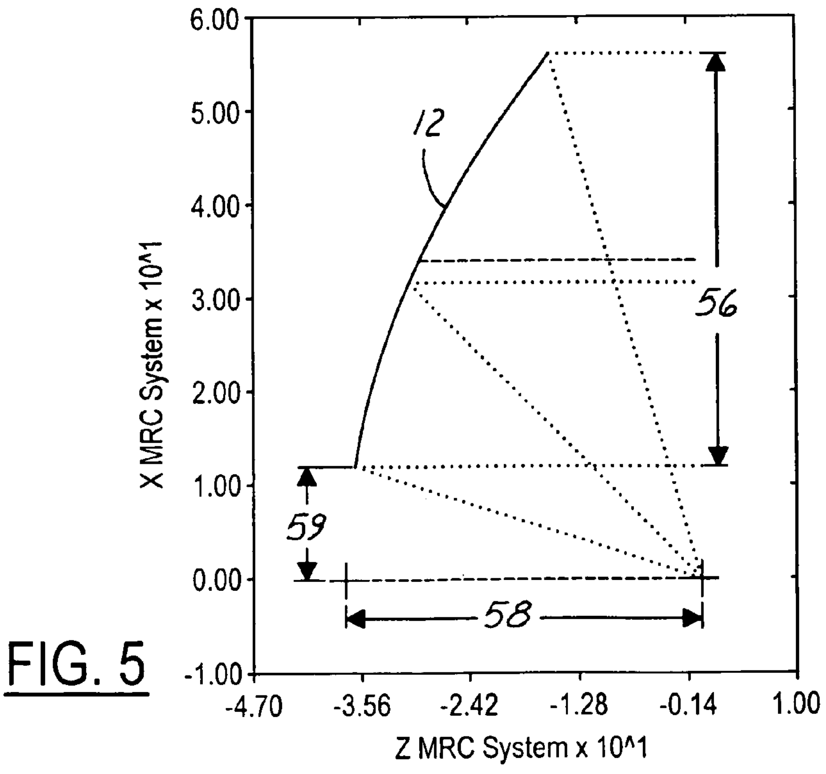
FIG. 5 is a diagram of a single offset parabolic reflector according to another embodiment of the present invention.

FIG. 5 shows an embodiment of the geometry of one reflector 12 of the four reflectors in the system, not shown in FIG. 5, in accordance with the example application of the present invention. The aperture has a predetermined diameter 56, focal length 58, and offset clearance 59. The reflector 12 is fed by the dual-band horns, also not shown in FIG. 5. Each feed horn in conjunction with the reflector produces downlink and uplink beams that are congruent and have identical beam coverage while minimizing the interference with beams that reuse the same frequency. The focal point of the reflector 12 is made to coincide with the horn phase center corresponding to the downlink frequency, the phase center of the downlink band being a predetermined distance inside the aperture plane of the horn. The result is a defocusing of the uplink frequencies, the phase center of the uplink band being at a predetermined distance in side the aperture plane of the horn. The radiation patterns of the antenna are almost identical at both ends over the coverage region.

A specific example of the present invention is being described hereinafter. However, it should be noted that the dimensions, parameters and specifications are being presented herein for example purposes only and are related to a particular application. One skilled in the art is capable of modifying the design dimensions for other applications without departing from the scope of the present invention.

Referring back to FIG. 4, the slot-widths 46 of the throat section 40 are exponentially increased from 4% to about 20% of the wavelength at a center frequency of the two bands, 25 GHz. The teeth width 48 is tapered down exponentially from 20% to about 4% of the center frequency wavelength. The depth of the corrugations 50 is varied by half wavelengths from 30 GHz to about a quarter wavelength at 20 GHz in order to achieve best match and low cross-polar levels at both bands. The throat section 40 of the horn 40 ends in a circular waveguide having a radius of 0.75 wavelengths at 20 GHz in order to support propagation of the balanced hybrid mode. The corrugated horn 50 has a diameter of 1.85 inches and a semi-flare angle of 10 degrees such that the phase center separation is about 1.0 inch between the two bands.

Referring now to FIG. 5, the reflector has an aperture of 44 inches, a focal length of 37 inches and an offset clearance of 12 inches. The focal point of the reflector is made to coincide with the horn phase center corresponding to the downlink frequency, which is about 0.45 inches inside the aperture plane of the horn. This results in about 1.0 inch defocusing of the uplink frequencies, whose phase center is about 1.45 inches inside the aperture plane of the horn.

Figure 6:
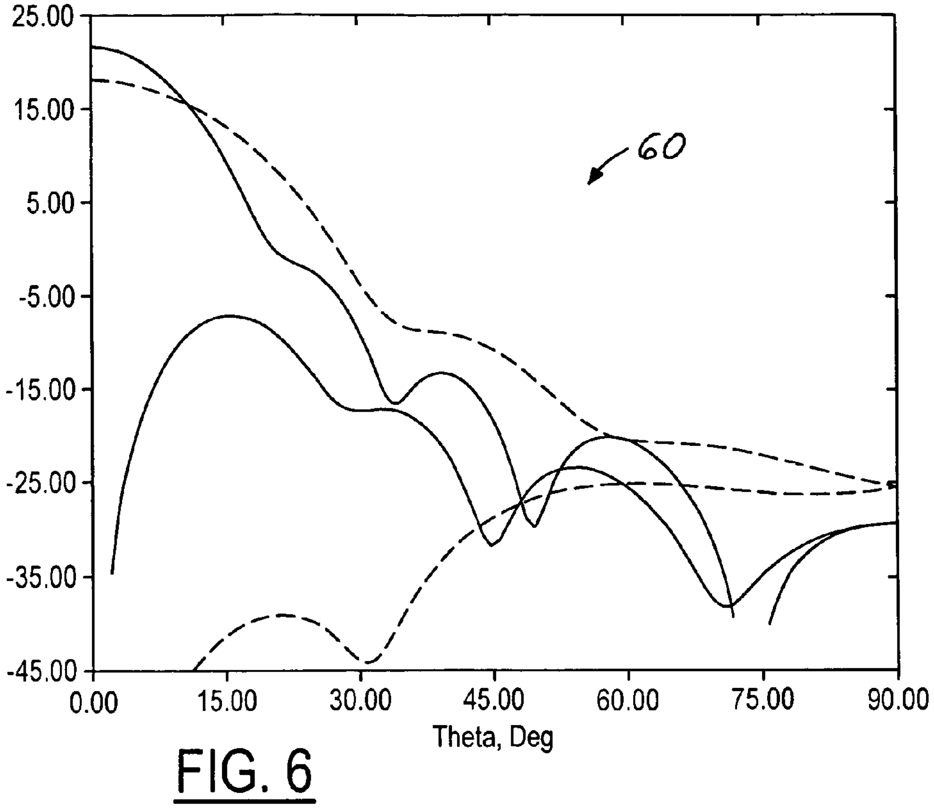
FIG. 6 is a graph of the computed radiated amplitude patterns of the dual-band corrugated horn shown in FIG. 4.
Figure 7:
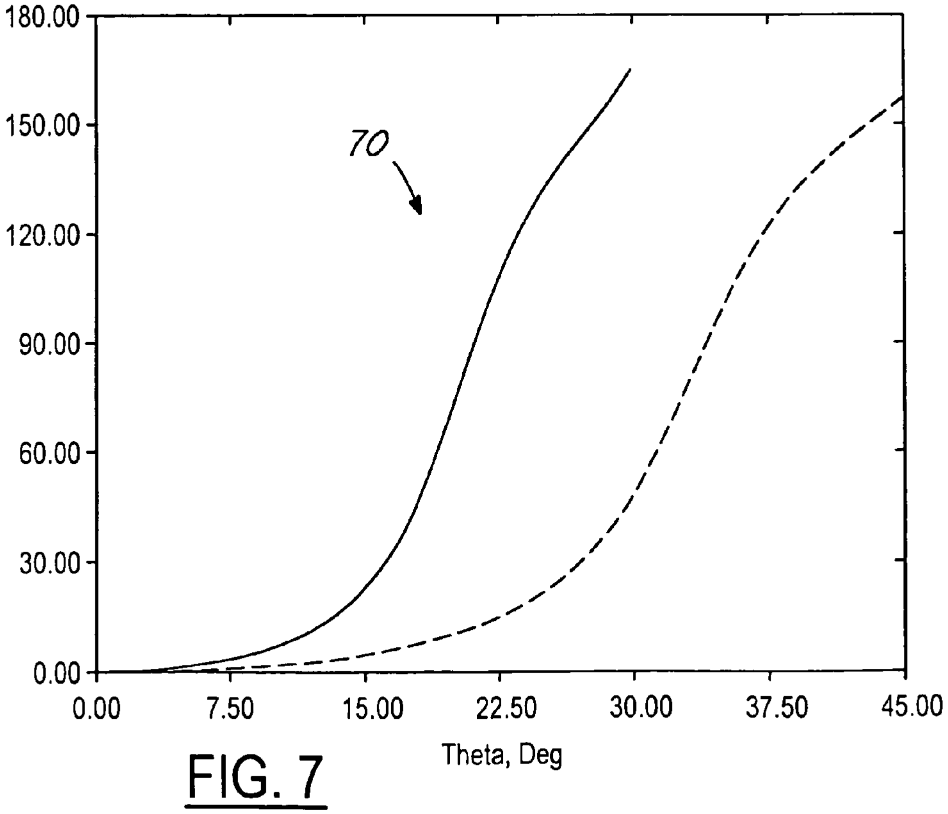
FIG. 7 is the computed radiated phase patterns of the dual-band corrugated horn shown in FIG. 4.

According to the present invention, the parameters of the corrugated horn are optimized to obtain a dual-band performance and the flare angle is adjusted to achieve desired phase center separation. FIG. 6 shows the computed radiation amplitude patterns 60 of the dual-band corrugated horn. The downlink amplitude is shown in a dotted line and the uplink amplitude is shown in a solid line. FIG. 7 shows the computed radiation phase patterns 70 of the dual-band horn at uplink and downlink. The downlink phase is shown as a dotted line and the uplink phase is shown as a solid line.

Figure 8:
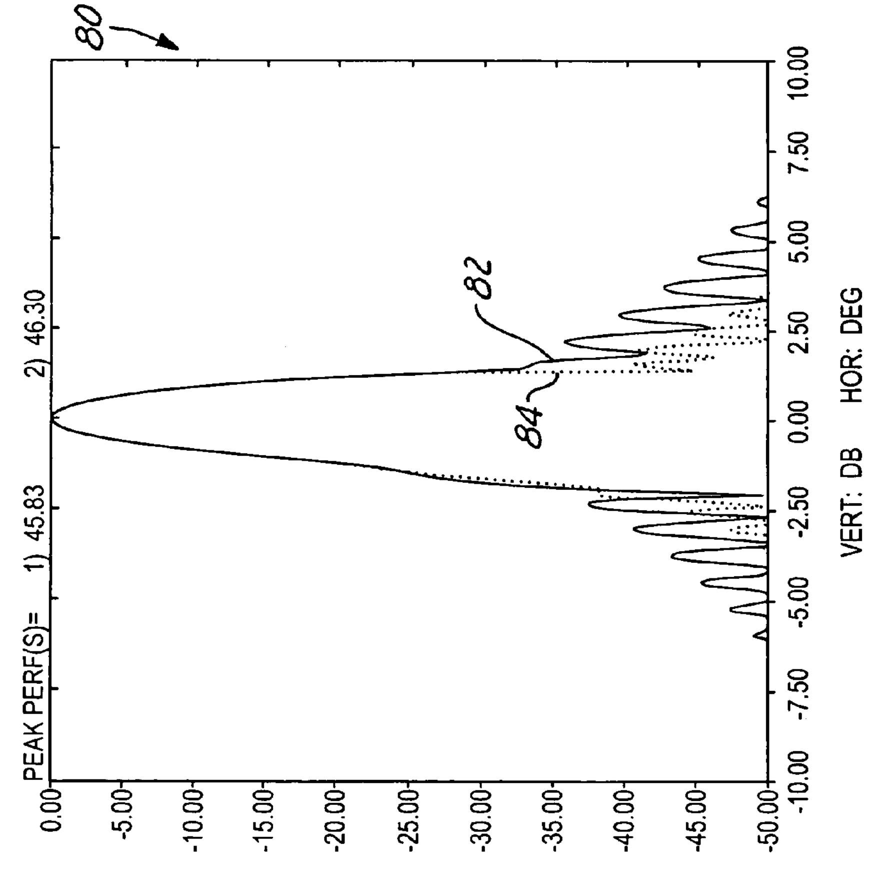
FIG. 8 is the computed secondary patterns of the dual-band multiple beam antenna of the present invention at transmit and receive frequencies for on-axis beams.

FIG. 8 shows the computed secondary patterns, for on-axis beams 80, of the antenna at the downlink frequencies 82 and at the uplink frequencies 84. It is clearly shown how the radiated patterns of the antenna are almost identical at both bands over the coverage region (1.1 degrees) and over the main-beam fall-off region up to about −25 dB relative to the beam peak.

Figure 9:
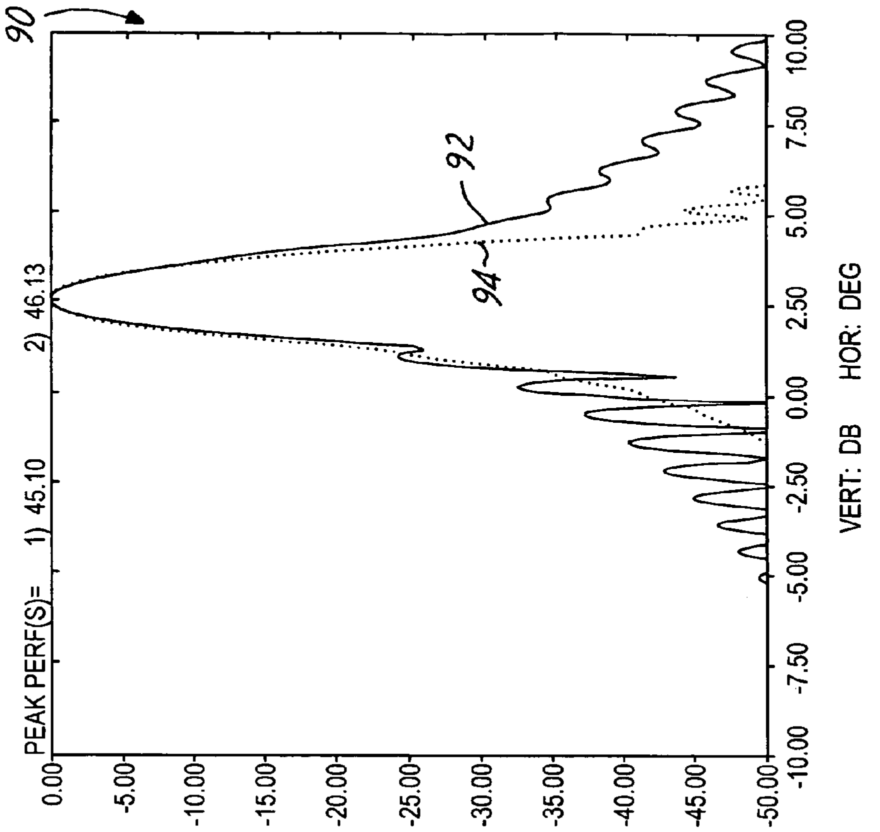
FIG. 9 is the computed secondary patterns of the dual-band multiple beam antenna of the present invention at transmit and receive frequencies for scanned beams.
Figure 10:
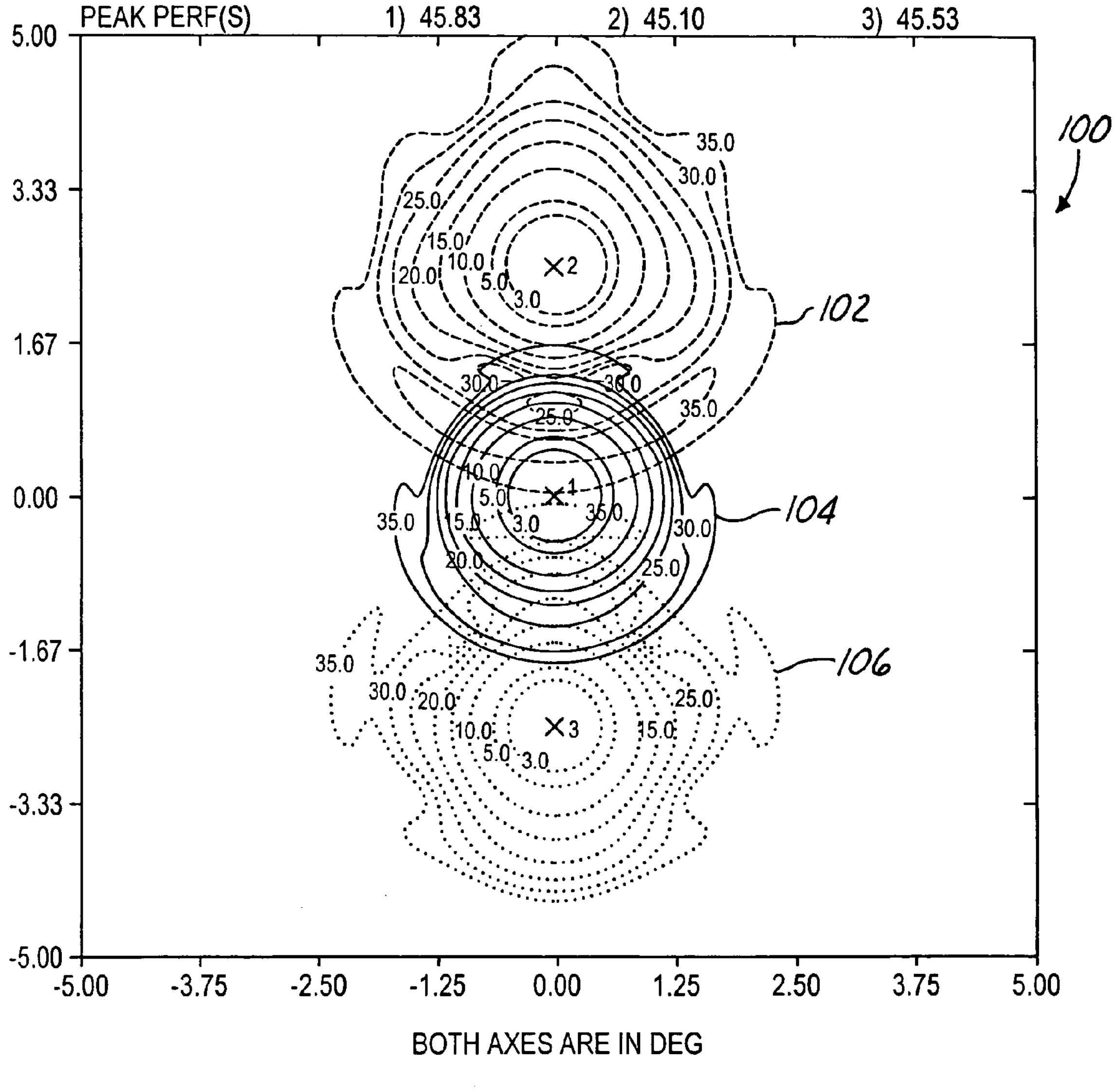
FIG. 10 is contour plots of three adjacent transmit beams reusing the same frequency and showing co-polar isolation.

FIG. 9 shows the computed secondary patterns, for scanned beams 90, for both the transmit band 92 and the receive band 94. The radiation patterns at the two bands also match. The contour plots 100 of three beams, 102, 104, and 106 that reuse the same frequency are shown in FIG. 10 at the transmit frequency band. The co-polar isolation among the reuse beams is better than 20 dB. The uplink contours, not shown, are similar to those shown in FIG. 10 and have co-polar isolation of better than 25 dB among the reuse beams.

The present invention employs only one set of reflectors that are common to both the downlink and the uplink frequencies. The feed horns are diplexed and have specific design parameters. The horns exhibit frequency dependent radiation patterns and the phase centers are widely separated over the downlink and uplink frequency bands to obtain desired dual-band performance.

There are several variations that may be made to the examples described herein without departing from the scope of the present invention. For example, the beams can also be optimized by shaping the surface of the reflector. The shaping of the reflector can be such that the coverage gain and/or co-polar isolation of the multiple beam antenna are optimized. Another example is that the dual-band horn can be realized using a smooth-walled circular or square horn instead of a corrugated horn. The invention covers all alternatives, modifications, and equivalents, as may be included within the spirit and scope of the appended claims.

What is claimed is:

1. A multiple beam antenna system on a communications satellite comprising:

a set of reflector antennas that shares transmit and receive band frequencies;

a plurality of dual-band frequency-dependent feed horns for feeding said set of reflector antennas and generating a cell reuse pattern on the ground;

a phase center for said transmit frequency band located a predetermined distance in an aperture of a horn in said plurality of horns;

a focal point for a reflector in said set of reflector antennas that coincides with said phase center for said transmit frequency band:

a phase center for said receive frequency band located a predetermined distance from said phase center for said transmit frequency band in said aperture of said horn to defocus said receive frequency band for the purpose of under illuminating said reflector at uplink frequencies;

whereby said plurality of feed horns illuminates said reflector optimally at downlink frequencies and under illuminates said reflector at uplink frequencies.

2. The multiple beam antenna system of claim 1, wherein an entire surface of said reflector is illuminated at the uplink frequencies and the downlink frequencies.

* * * * *